United States Patent [19]
Kardach

[11] Patent Number: 6,018,803
[45] Date of Patent: *Jan. 25, 2000

[54] METHOD AND APPARATUS FOR DETECTING BUS UTILIZATION IN A COMPUTER SYSTEM BASED ON A NUMBER OF BUS EVENTS PER SAMPLE PERIOD

[75] Inventor: James P. Kardach, Saratoga, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/768,913

[22] Filed: Dec. 17, 1996

[51] Int. Cl.[7] ..................................... G06F 11/34
[52] U.S. Cl. .................. 713/323; 713/340; 713/502; 714/39; 714/47
[58] Field of Search .................. 395/750.05, 750.04, 395/750.02, 287, 556, 557, 183.15, 750.08, 184.07; 713/300, 310, 322, 323, 340, 502, 503; 710/107, 36; 714/39, 47

[56] References Cited

U.S. PATENT DOCUMENTS

| | | |
|---|---|---|
| 5,396,635 | 3/1995 | Fung . |
| 5,426,741 | 6/1995 | Butts, Jr. et al. ...................... 395/325 |
| 5,444,855 | 8/1995 | Thompson ............................. 395/287 |
| 5,564,015 | 10/1996 | Bunnell ............................. 395/184.01 |
| 5,778,194 | 7/1998 | McCombs ............................. 395/280 |

*Primary Examiner*—Ayaz R. Sheikh
*Assistant Examiner*—Rupal D. Dharia
*Attorney, Agent, or Firm*—Cindy T. Faatz

[57] ABSTRACT

A bus utilization detection circuit and method. An input is configured to be coupled to a bus to detect bus events. A circuit coupled to the input determines a number of bus events during a first sample period to indicate a percent bus utilization. If the number of bus events during the first sample period meets a first predetermined threshold value, then an activity event is generated. In another embodiment, an activity event is generated only if during a second sample period, the number of first sample periods for which the percent bus utilization meets the first threshold value meets a second threshold value.

26 Claims, 4 Drawing Sheets

METHOD AND APPARATUS FOR DETECTING BUS UTILIZATION IN A COMPUTER SYSTEM BASED ON A NUMBER OF BUS EVENTS PER SAMPLE PERIOD

BACKGROUND OF THE INVENTION

1. Field of the Invention

The present invention relates to the field of power management in computer systems, and in particular, to the field of detecting bus utilization in a computer system.

2. Description of Related Art

Many computer systems which include at least one automated power management capability rely on an idle timer to determine when power management measures should be taken. The idle timer is loaded with an initial idle time, starts counting down from that time and then, if a system activity event is detected, the idle timer is reloaded with the initial idle time. If the idle timer expires before a system activity event is detected, the system is considered idle and may enter a suspend mode or other power management measures may be taken. The system activity events which cause the idle timer to reload or reset are primarily input/output (I/O) addresses and interrupts such as keyboard or mouse events.

An issue arises, however where the computer system is engaged in a processing activity which is not detected by the detection circuitry coupled to the idle timer and thus, which does not cause the idle timer to reset. In such a case, the computer system may enter a suspend mode even while processing is underway. For example, because the playing of multimedia movies on a computer system may not cause any I/O address or interrupt events, the activity may go undetected by the computer system and the computer system may be considered idle. In this case, the computer system may enter a suspend mode while the movie is still in progress.

Thus, a method and apparatus for detecting activity which does not necessarily generate I/O addresses and interrupts is needed.

SUMMARY OF THE INVENTION

A method and apparatus for detecting utilization of a bus in a computer system is described. The bus utilization detection apparatus of the invention includes an input configured to be coupled to the bus to detect bus events. A first circuit is coupled to the input to determine a number of bus events during a first sample period. If the number of bus events during the first sample period meets a first threshold value, an activity event is generated.

In one embodiment, the invention includes a second circuit which determines during a second sample period, a number of first sample periods in which the first threshold value is met and generates an activity event only if the number of first sample periods in which the first threshold value is met during the second sample period meets a second threshold value.

BRIEF DESCRIPTION OF THE DRAWINGS

The invention will be understood more fully from the detailed description given below and from the accompanying drawings of embodiments of the invention, which, however, should not be taken to limit the invention to the specific embodiments, but are for explanation and understanding only.

DETAILED DESCRIPTION OF THE INVENTION

A method and apparatus for detecting bus utilization to provide for effective power management is described. In the following description, numerous specific details are set forth such as specific combinatorial logic, sample periods, bus utilization percentages, and threshold values in order to provide a thorough understanding of the invention. However, it will be appreciated by those skilled in the art that the invention may be practiced without these specific details. In other instances, well-known circuits, structures and functions have not been described in detail in order to avoid obscuring the invention.

Overview of the Invention

The invention provides a method and apparatus for detecting bus utilization such that a computer system in accordance with one embodiment of the invention is prevented from entering a low power state while activities such as multimedia activities, which may not generate I/O addresses or interrupts, are in process. At the same time, in accordance with one embodiment, the invention provides for triggering of power management features in the presence of idle application bursts such as may be caused by screensaver software, for example, which generates periodic video activity, but for which it may not be desirable to prevent the system from entering a low power mode.

The invention provides the above advantages through a method and apparatus which detects a percent bus utilization by determining a number of bus events which occur during a first predetermined sample period and which also detects a number of times that the percent bus utilization exceeds a first predetermined threshold value during a second predetermined sample period. In accordance with one embodiment, if the number times that the percent bus utilization exceeds the first predetermined threshold value exceeds a second predetermined threshold value, an activity event is generated. In an alternate embodiment, if the percent bus utilization alone exceeds a first predetermined threshold value, an activity event is generated.

The activity event may be used to reset a global standby timer or another circuit which is used to indicate when a computer system is idle such that power management measures should be taken. Further, in one embodiment, the first and second predetermined threshold values are programmable such that the bus utilization circuit of the invention can be tuned to detect varying levels of bus activity depending on the applications for which the method and/or apparatus of the invention are utilized. The invention is described in detail below.

A Computer System in Accordance with the Invention

Figure 1:
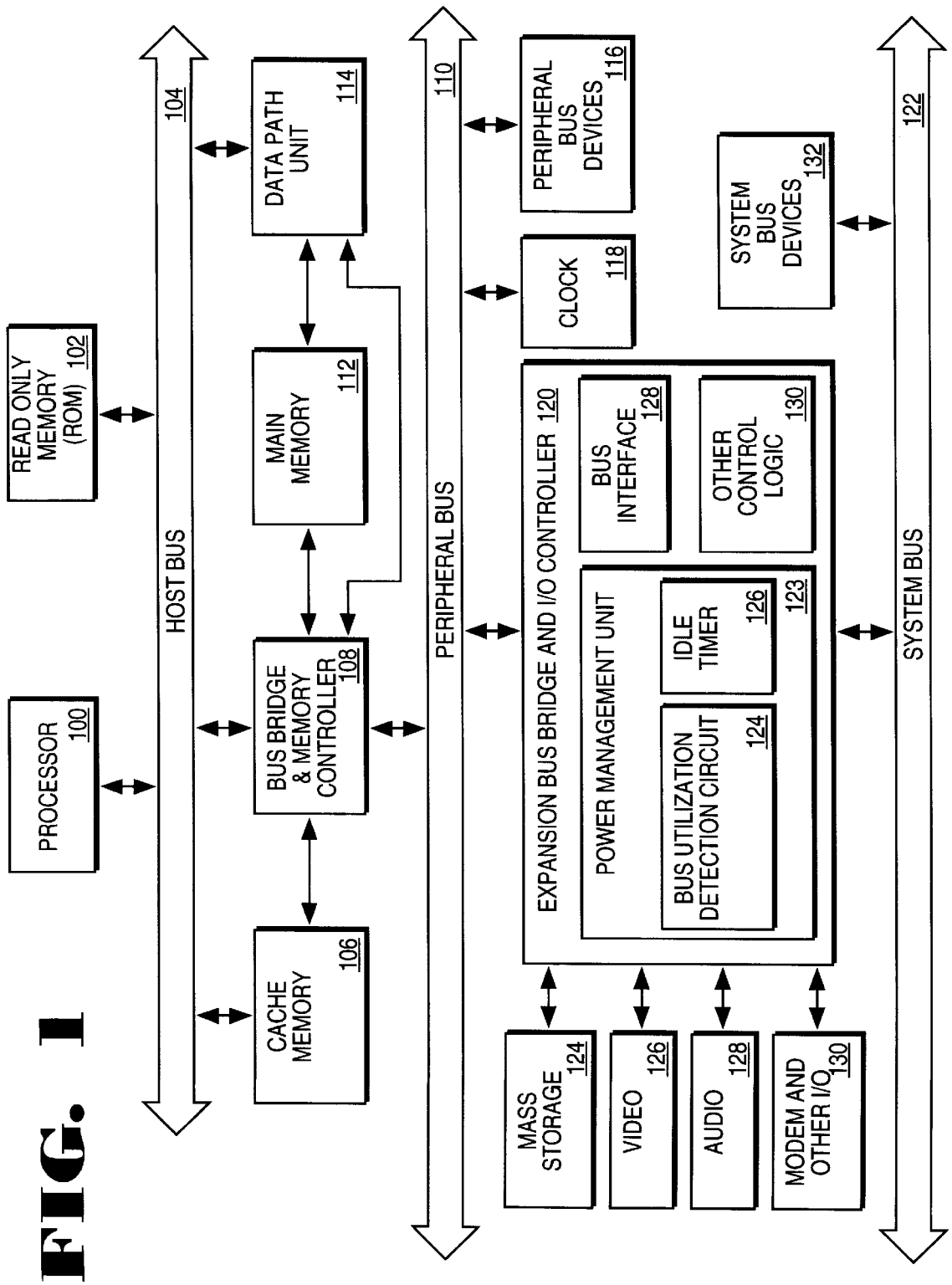
FIG. 1 illustrates a block diagram of a computer system in which one embodiment of the invention may be advantageously utilized.

FIG. 1 illustrates one embodiment of a computer system in which the bus utilization detection method and apparatus of the invention may be advantageously utilized. A processor 100 for processing instructions and a read only memory (ROM) 102 for storing static instructions for the processor 100 are coupled to a host bus 104.

Also coupled to the host bus 104 are a cache memory 106 for storing frequently and/or recently used instructions for the processor 100, a bus bridge and memory controller 108 for controlling communications between the host bus 104 and a peripheral bus 110, and for controlling memory access operations including cache memory access operations. A main memory 112 which may be comprised of random access memory (RAM) is coupled to the bus bridge and memory controller 108 and to a data path unit 114 which operates to control data transfer between the processor 100 and the main memory 112. The main memory 112 stores instructions and data for the processor 100 during processing.

The peripheral bus 110 is a peripheral components interconnect (PCI) bus in one embodiment, but may be another type of bus in alternate embodiments. Coupled to the peripheral bus 110 are various peripheral bus devices 116, a clock 118, and an expansion bus bridge and input/output controller 120. The bus bridge and input/output controller 120 controls communications between the peripheral bus 110 and a system bus 122. The bus bridge and controller 120 also provides control signals for the operation of input/output devices including input/output devices such as a mass storage device 124, a video device 126, an audio device and/or a modem device 130.

The bus bridge and controller 120 includes a power management unit 123 for controlling power management capabilities of the computer system of FIG. 1 which may include the ability to suspend or trigger a lower power mode of operation for particular components and/or the entire computer system. The power management unit 123 includes a bus utilization detection circuit 124 and an idle timer 126 which together are used to determine when the computer system or particular components of the computer system are idle such that power management measures are indicated. The bus utilization detection circuit 124 is described in more detail below in reference to FIG. 2. The bus bridge and input/output controller 120 also includes a bus interface 128 for interfacing with the peripheral bus as well as other control logic 130 such as a system bus interface and input/output component control logic.

System bus devices 132 are coupled to the system bus 122. Communications between the system bus devices 132 and other components in the computer system are controlled by the bus bridge 120. The system bus 122 is an industry standard architecture (ISA) bus in one embodiment, but may be another type of bus such as an extended industry standard architecture (EISA) bus in alternate embodiments.

Although a particular computer system configuration is described and illustrated in FIG. 1, other types of computer systems including additional components not shown in FIG. 1, or which do not include all components shown in FIG. 1 are also within the scope of the invention.

The Bus Utilization Detection Circuit of the Invention

Figure 2:
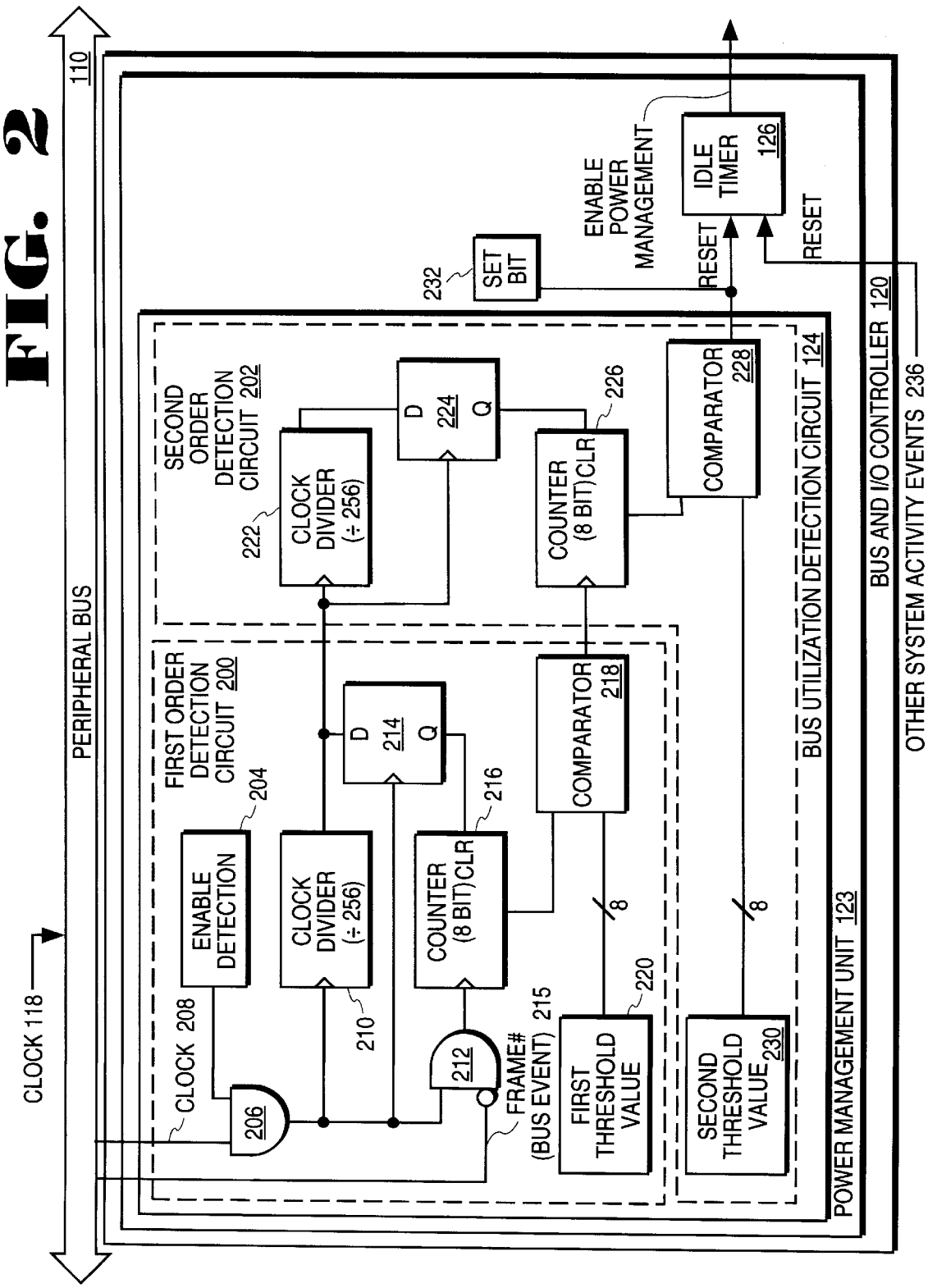
FIG. 2 illustrates one embodiment of the bus utilization detection circuit of the invention which detects activity based on a percent of percent bus utilization.

One embodiment of the bus utilization detection circuit of the invention is illustrated in FIG. 2. The bus utilization detection circuit 124 includes a first order detection circuit 200 and a second order detection circuit 202. The first order detection circuit 200 includes an optional enable detection bit 204 which is programmable to enable and disable the operation of the bus utilization detection circuit 124. The enable detection bit 204 may be programmed through a system configuration routine in the basic input/output system (BIOS) which is stored in the ROM 102 (FIG. 1) or through another user interface. Alternatively, the enable detection bit 204 may be set by the system manufacturer or may not be present in alternate embodiments such that the bus utilization detection circuit 124 is always enabled.

The enable detection bit 204 has an output coupled to one input of an AND gate 206 which has a second input coupled to receive a clock signal 208 from the clock 118 coupled to the peripheral bus 110. An output of the AND gate 206 is coupled to an input of a clock divider circuit 210 which in one embodiment, divides the clock signal by 256. The output of the AND gate 206 is also coupled to provide the clock signal 208 to one input of a second AND gate and to a clock input of an edge-triggered D flip-flop 214. A second input of the AND gate 212 receives the complement of a bus event signal 215, which can be the FRAME# signal from the PCI bus 110 in one embodiment, although in alternate embodiments, the bus event signal 215 may be any signal which represents bus activity on a PCI or any other type of bus. An output of the clock divider circuit 210 is coupled to the D input of the flip-flop 214 which has a Q output coupled to the CLEAR input of a counter circuit 216.

The counter circuit 216 is an 8-bit counter in one embodiment which has an output coupled to a first input of a comparator 218. A second input of the comparator 218 is coupled to receive a first threshold value 220 which is stored in a first data store. The first threshold value 220 is programmable in one embodiment such that the threshold value can be adjusted based on the specific applications for which the bus utilization detection circuit 124 is used. The determination of the first threshold value 220 is discussed in more detail below.

The second order detection circuit 202 is coupled to the first order detection circuit 200 as described below. An output of the first clock divider circuit 210 is coupled to a clock input of a second clock divider circuit 222. The second clock divider circuit 222 also divides the incoming clock signal (the output of the first clock divider circuit 210 in this case) by 256 in one embodiment. The clock input of the second clock divider circuit 222 is also coupled to a clock input of a second edge-triggered D flip-flop 224 such that the D flip-flop 224 receives the same clock signal as is received by the clock divider 222. An output of the clock divider 222 which provides the divided clock signal is coupled to the D input of the D flip-flop 224 which has a Q output coupled to a CLEAR input of a second counter 226.

The second counter 226 is also an 8-bit counter in one embodiment and has an input coupled to the output of the first comparator 218. An output of the counter 226 is coupled to an input of a second comparator 228 which has a second input coupled to receive a second threshold value 230 from a second data store. The second threshold value 230 is also programmable in one embodiment such that the bus utilization circuit of the invention can be further optimized for particular applications as described below. An output of the comparator 228 of the second order detection circuit 202 is coupled to a set bit 32 in one embodiment and to a reset input of the idle timer 126. The idle timer 126 may also be coupled to receive signals from sources external to the bus utilization circuit 124 over the bus 236 indicating other system activity events which may reset the idle timer 126. An output of the idle timer is coupled to enable power management or other capabilities when the system is determined to be idle as discussed in detail below.

With continuing reference to FIG. 2, the operation of one embodiment of the bus utilization detection circuit 124 is described in more detail. The bus utilization detection circuit 124 is coupled to the peripheral bus 110, a PCI bus in this example, such that the FRAME# signal is received at an inverted input of the AND gate 212. The FRAME# signal indicates the beginning of a PCI data phase and indicates to the bus utilization detection circuit 124 that a bus event is occurring. The input of the AND gate 212 is inverted such that the complement of the FRAME# signal is received by the AND gate as FRAME# is an active low signal.

In embodiments which utilize the enable detection bit 204, the bus utilization detection circuit 124 only operates if the enable detection bit 204 is set. If the enable detection bit 204 is not set, the clock signal 208 is not passed through the AND gate 206 to the input of the clock divider circuit 210 or to the input of the AND gate 212 and the bus utilization detection circuit 124 will not operate. Assuming the bus utilization detection circuit 124 is enabled, the PCI clock signal 208 is received from the PCI bus 110 at the clock input of the clock divider circuit 210. The clock divider circuit 210 divides the clock signal by 256 such that the output of the clock divider circuit 210 provides only one clock cycle for every 256 clock cycles of the input clock signal 208 from the clock 118 to provide a first sample period.

The PCI clock signal 208 is also received at the input of the AND gate 212. The output of the AND gate 212 is asserted and the counter 216 is incremented for every clock cycle during which a bus event is detected as indicated by assertion of the FRAME# signal 215. The counter 216 is incremented until it is cleared by assertion of a signal on the CLEAR input of the counter 216 at the end of the first sample period.

The edge-triggered D flip-flop 214 and the clock divider circuit 210 control the timing of the first sample period during which a number of bus events detected is counted. The D flip-flop 214 is coupled to the clock divider, the clock input 208 and the counter 216 in such a manner that the counter 216 is incremented for each bus event detected as indicated by the FRAME# signal 215 and then cleared after 256 PCI clock cycles in this example, when the output of the clock divider circuit 210 transitions to indicate the end of the divided-by-256 clock period. In this manner, the first counter 216 counts a number of bus events detected for the predetermined first sample period. In this example, the counter 216 counts a number of bus events detected per number of clock cycles for up to 256 PCI clock cycles in the first sample period to provide a percentage bus utilization value. The percentage bus utilization value detected by the first order detection circuit 200 is provided at the output of the counter 216 which is coupled to one input of the comparator 218.

The second input to the comparator 218 is coupled to receive the first threshold value 220 which may be programmed to a particular threshold value in one embodiment depending on the desired sensitivity of the bus utilization circuit 124. In one embodiment, the first threshold value 220 is represented as an 8-bit number such that a number from 0 to 255 may be stored as the first threshold value 220. As the number of clock cycles of the clock 118 in the first sample period is 256, the percent bus utilization can be determined by dividing the number of bus events detected during the first sample period by 256. The first threshold value 220 is set based on this relationship.

For example, if it is undesirable to recognize bus activity unless it is present for 50% or more of the time, the first threshold value is set to 127 or 50% of the number of PCI clock cycles in the sample period. Similarly, if it is desirable to only recognize bus activity that is detected during 100% of the sample period, the first threshold value is set to 255 such that the first threshold value is only met if bus events are detected during 100% of the sample period. The first threshold value may be programmed through a configuration routine in the BIOS or through another user interface.

The comparator 218 then compares the output of the counter 216 indicating the number of bus events detected in the first sample period to the first threshold value 220. In one embodiment, the comparator 218 is a pulse-on-match comparator such that when the output of the counter 216 is equal to the first threshold value 220, the output of the comparator 218 is asserted. The counter 226 of the second order detection circuit 202 is then incremented in response to the assertion of the comparator 218 output.

The counter 226 is an 8-bit counter which is incremented to count a number of first sample periods for which the number of bus events detected by the first order detection logic meets the first threshold value during a second predetermined sample period. In other words, the counter 226 counts a number of times the percent bus utilization meets the predetermined first threshold value 220 during the second sample period.

As in the first order detection circuit 200, the second predetermined sample period is controlled by a clock divider circuit 222 and an edge-triggered D flip-flop 224. In one embodiment, the clock divider circuit 222 is a divide-by-256 clock divider circuit which divides the output of the first clock divider circuit 210 by 256. In this manner, the output of the second clock divider circuit 222—which determines the second predetermined sample period—produces one output clock signal for every 256 output signals from the first clock divider circuit 210 or every 65,536 ($256^2$) clock signals from the clock 118. The clock divider circuit 222 and the flip-flop 224 are coupled to the counter 226 such that the counter is reset every $256^2$ clock cycles at the end of each of the second predetermined sample periods. In this manner, the counter 226 provides at its output a number of first sample periods in which the detected number of bus events as indicated by the FRAME# signal meets or exceeds the first threshold value 220 during the second sample period. This figure is referred to herein as a percent of percent bus utilization.

The output of the counter 226 is compared by the comparator 228 to a second threshold value 230, which in one embodiment is programmable in a similar manner to the first threshold value 220 such that the bus utilization circuit 124 can be optimized to meet particular application needs. The comparator 228 is also a pulse-on-match comparator such that if the output of the counter 226 meets the second threshold value 230, the output of the comparator 228 is asserted to indicate a system activity event.

In one embodiment, the output of the comparator 228 is coupled to one or more idle timers such as the idle timer 126. In one embodiment, the idle timer 126 is a global standby timer which is configured to count down from a predetermined idle time period, and which triggers a power management event or other system event if the timer reaches 0 before it is reset by a system activity event. The output of the comparator is coupled to a reset input of the idle timer 126 such that the idle timer 126 is reset each time a system activity event is indicated by the bus utilization circuit 124. The idle timer may also be coupled to receive signals which indicate system activity from other external sources over the bus 236.

In one embodiment, the output of the comparator 228 is also coupled to the set bit 232. In this case, assertion of the comparator 228 output sets the set bit 232 which is optionally included in this embodiment to provide for tuning of the bus utilization circuit 124. The set bit 232 can only be cleared by writing to the set bit 232 through a software configuration routine. In this manner, one can more easily determine which activities are detected by the bus utilization detection circuit 124 for particular threshold values 220 and 230 providing for tuning of the circuit for particular applications.

In the manner described above, the bus utilization activity circuit of one embodiment of the invention can be tuned to detect particular types of activity while screening other types of activity out. For example, the bus utilization circuit of the invention can be tuned such that it is capable of detecting the playing of Motion Picture Experts Group (MPEG) format movies, while ignoring other activity such as screensaver activity even when the screensaver is set on a very vigorous setting.

Figure 3:
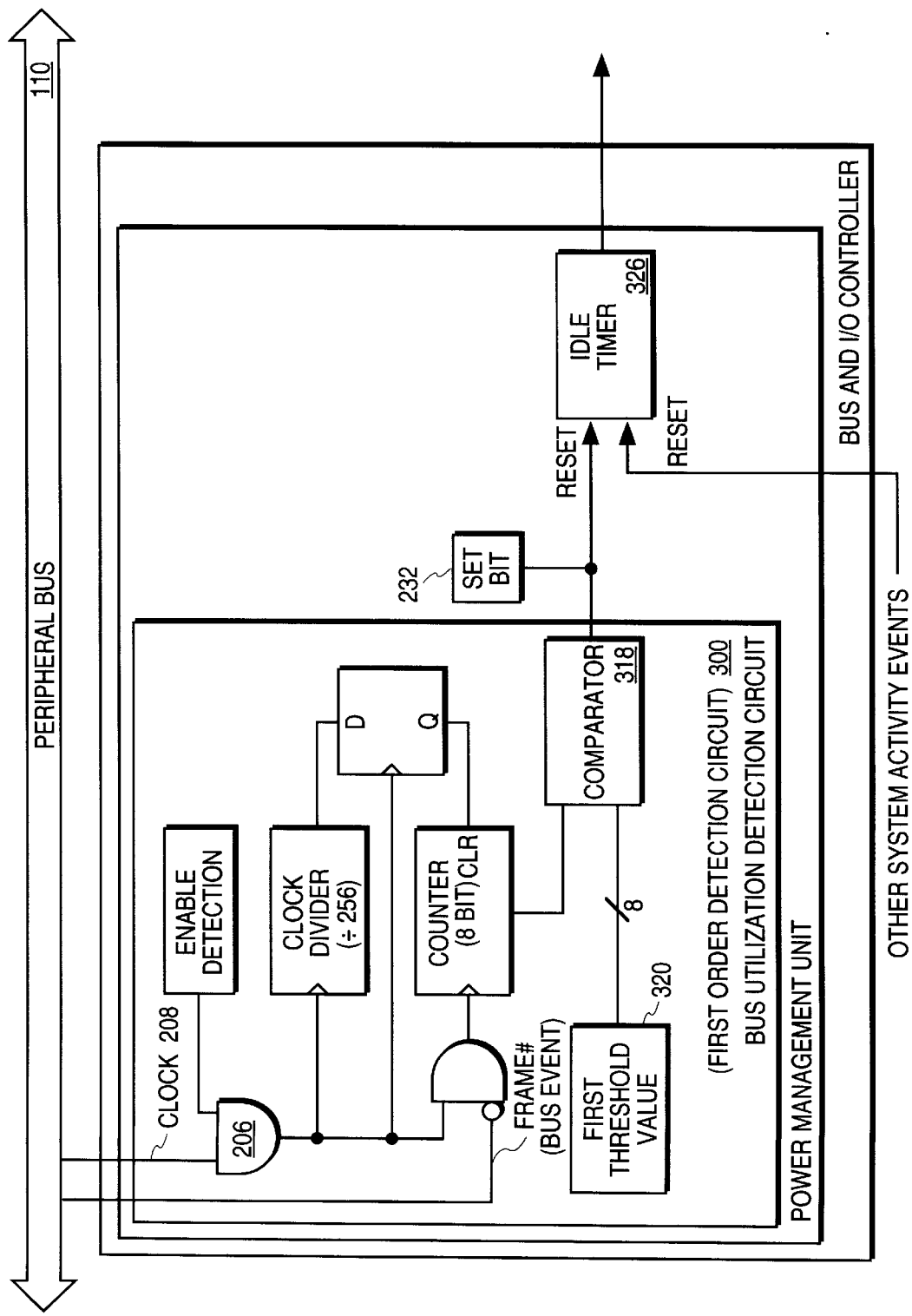
FIG. 3 illustrates an alternate embodiment of the bus utilization detection circuit of the invention which detects activity based on percent bus utilization.

FIG. 3 shows an alternate embodiment of the bus utilization detection circuit of the invention in which the first order detection circuit alone is used to detect bus activity. The first order detection circuit 300 is configured in the same manner as the first order detection circuit 200 of the embodiment illustrated and described in reference to FIG. 2 with the exception that the output of the comparator 318 is coupled directly to the idle timer 326 and the set bit 332. In this manner, an activity event is generated if the percent bus utilization, i.e. the number of bus events detected exceeds the first threshold value 320 in a first sample period controlled in the manner described above in reference to FIG. 2.

While particular sample periods and numbers of bits have been described above in the context of the counters, clock dividers and threshold values, it will be appreciated by those of skill in the art that different sample periods, and counter and clock divider sizes may also be used in accordance with the invention. Other types of comparators may also be used such that the output of a comparator is triggered only if the threshold value is exceeded, for example. Further the particular combinatorial and sequential logic used in the examples discussed above is not intended to be considered limiting. Other logic combinations which accomplish a similar result are within the scope of the invention.

It will also be appreciated by those of skill in the art that although the bus utilization detection circuit 124 is configured in the power management unit 123 of the bus bridge and input/output controller 120 in one embodiment, the bus utilization detection circuit of the invention may be configured on another integrated circuit device in a computer system including an integrated circuit coupled to a bus other than the peripheral bus 110. In alternate embodiments, the bus utilization detection circuit 124 may be implemented as a standalone circuit.

Although the bus utilization circuit is used in the example above to detect video activity, the bus utilization circuit may be advantageously used to detect other types of activities such as soft modem activities for example. Similarly, although the examples herein are provided in the context of determining when power management measures should be taken, other types of operations which rely on the detection of particular activities may also benefit from the bus utilization detection circuit and method of the invention.

The Bus Utilization Detection Method of the Invention

Figure 4:
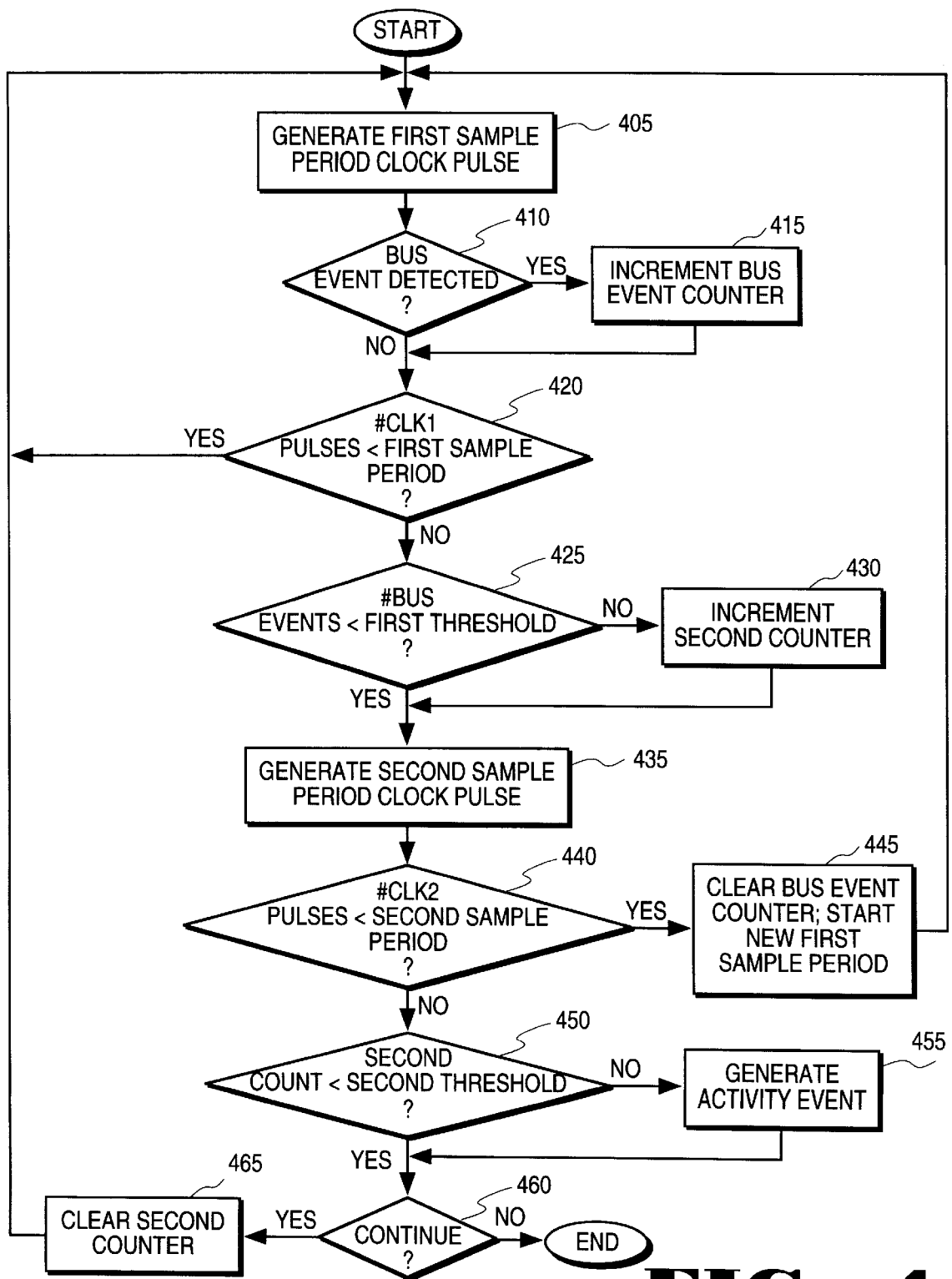
FIG. 4 is a flow diagram illustrating one embodiment of the bus utilization activity detection method of the invention.

The bus utilization detection method of one embodiment of the invention is described in reference to the flow chart of FIG. 4 which begins at step 400. In step 405, a first sample period clock pulse is generated. In step 410, it is determined whether during the clock pulse, a bus event is detected. If so, then in step 415, a bus event counter is incremented and the process continues at step 420. If a bus event is not detected, the process proceeds at step 420. In step 420, it is determined whether the number of clock pulses which have been generated is less than the number of clock pulses in the first sample period (256 in one embodiment). If not, the method repeats starting at step 405 as described above.

If the number of clock pulses is not less than the number of clocks in the first sample period, then in step 425, it is determined whether the number of bus events counted is less than a first threshold value which is programmable in one embodiment. If not, then in step 430, a second counter is incremented to count a first sample period in which the number of bus events exceeded the first threshold value. If the number of bus events is less than the first threshold or once the second counter is incremented, the method proceeds at step 435 in which a second sample period clock pulse is generated.

At step 440, it is determined whether the number of second sample period clock pulses is less than the number of clock pulses in the second sample period (256 clock pulses in one embodiment). If so, then in step 445, the bus event counter is cleared, a next first sample period is started and the method repeats as described above at step 405.

If the number of second sample period clock pulses is not less than the second sample period, then in step 450, it is determined whether the number indicated by the second counter is less then a second threshold value which is also programmable in one embodiment. If not, then in step 455 an activity event is generated. If the number indicated by the second counter is less than the second threshold value, then in step 460, it is determined whether activity detection should continue. If so, then in step 465, the second counter is cleared and the method repeats as described above beginning at step 405. If not, the method ends at step 470.

In this manner, a particular level of bus utilization activity is detected and used to determine whether a computer system should be considered idle or not in the case of a system employing power management features, for example. The method of the invention may include additional steps such as programming the first and second threshold values which are not discussed in reference to FIG. 3. Further, alternate embodiments of the method of the invention may not include all of the steps illustrated in FIG. 3.

The bus utilization detection method and apparatus of the invention provide several advantages over existing approaches to detecting bus utilization in order to control and enable power management capabilities. The bus utilization circuit of the invention is capable of filtering out the bursty nature of a high throughput input/output bus such as a PCI bus to detect activities such as the playing of MPEG movies as discussed above.

For example, if an application, such as an MPEG decode application requires a 16 Mbytes per second bandwidth to video, the PCI bus will accomplish this by generating short bursts of high bandwidth cycles. The PCI bus may, for example, generate transfers of 256 bytes at 100 Mbytes per second that are spread out over time such that the overall system sees a continuous 16 Mbyte/sec bandwidth to video over a second of time. On closer examination, however, it will be seen that the short, high bandwidth bursts are followed by an idle bus within a millisecond sample window. Existing circuits which measure only PCI bandwidth can miss this type of activity.

Further, the bus utilization circuit and method of the invention provides the advantage that it can be tuned so that applications such as screensavers and graphically implemented system clocks do not prevent the computer system from entering a low power mode or from triggering the implementation of other power management features. The invention accomplishes this by detecting only sustained bandwidth and ignoring idle application bursts which generate lower levels of video or other activity only periodically.

Also, as discussed above, the bus utilization circuit and method of the invention can be tuned such that the level of bus activity detected in accordance with the invention can be adjusted to meet the requirements of particular systems or applications. In this manner, the invention provides the system designer or manufacturer added flexibility in designing power management and other features.

Thus, the invention provides a method and apparatus for detecting bus utilization in order to better manage the triggering of power management or other capabilities which rely on detecting bus activity in a computer system. Whereas many alterations and modifications of the invention may occur to one of ordinary skill in the art after having read the foregoing description, it is to be understood that the particular embodiments shown and described by way of illustration are in no way intended to be considered limiting. Therefore, references to details of various embodiments are not intended to limit the scope of the claims which themselves recite only those features regarded as essential to the invention.

I claim:

1. An apparatus for detecting activity on a bus in a computer system, the apparatus comprising:

an input to be coupled to the bus to detect bus events;

a first circuit coupled to the input to determine a number of bus events during a first sample period, the first circuit to assert an activity signal if the number of bus events during the first sample period meets a first threshold value; and a second circuit coupled receive an activity signal from the the first circuit, the second circuit to count a number of times the activity signal is asserted during a second sample period, wherein the first sample period is a subset of the second sample period the second circuit to generate an activity event if the number of times the activity signal is asserted meets or exceeds a second threshold value, the second circuit to indicate bus inactivity if an activity event is not generated within an idle time period wherein the first and second sample periods are each a subset of the idle time period.

2. An apparatus for detecting activity on a bus in a computer system, the apparatus comprising:

an input to be coupled to the bus to detect bus events; and a circuit coupled to the input to determine a number of first sample periods within a second sample period in which a number of bus events detected meets a first threshold value, the circuit to generate an activity event if the determined number of first sample periods meets or exceeds a second threshold value, the circuit to indicate bus inactivity if an activity event is not generated within an idle time period wherein the first and second sample periods are each a subset of the idle time period.

3. The apparatus as set forth in claim 2 wherein the first sample period is 256 clock cycles and the second sample period is 256×256 clock cycles.

4. The apparatus as set forth in claim 2 wherein the bus is a peripheral components interconnect (PCI) bus and the bus events are FRAME# signals.

5. The apparatus as set forth in claim 2 wherein the first and second threshold values are programmable.

6. The apparatus as set forth in claim 2 wherein an output of the circuit is to be coupled to a reset input of an idle timer such that the activity event resets the idle timer, the idle timer to indicate the third idle time period.

7. A bus utilization detection circuit comprising:

a bus event input to be coupled to a bus to detect bus events;

a first counter coupled to the bus event input to count a number of bus events detected during a first sample period;

a first comparator coupled to the first counter, the first comparator to assert a first signal if the number of bus events during the first sample period meets or exceeds a first threshold value;

a second counter coupled to the first comparator to count a number of times the first signal is asserted during a second sample period wherein the first sample periods is a subset of the second sample period; and a second comparator coupled to the second counter, the second comparator to assert an activity event signal when the number of times the first signal is asserted during the second sample period meets or exceeds a second threshold value, the second comparator to indicate bus inactivity if an activity event signal is not asserted during an idle time period wherein the first and second sample periods are each a subset of the idle time period.

8. The bus utilization detection circuit as set forth in claim 7 further including a first clock divider coupled to the first counter to divide an incoming clock signal to generate the first sample period, and a first flip-flop having an input coupled to an output of the first clock divider and an output coupled to a CLEAR input of the first counter such that the first counter is cleared at the end of the divided clock cycle from the first clock divider.

9. The bus utilization detection circuit as set forth in claim 8 further including a second clock divider coupled to the first clock divider to divide the output clock signal from the first clock divider to generate the second sample period, and a second flip-flop having an input coupled to the output of the second clock divider and an output coupled to a CLEAR input of the second counter such that the second counter is cleared at the end of the divided clock cycle from the second clock divider.

10. The bus utilization detection circuit as set forth in claim 7 wherein the first and second threshold values are programmable.

11. The bus utilization detection circuit as set forth in claim 7 wherein the first sample period is 256 clock cycles and the first counter is an 8-bit counter.

12. The bus utilization detection circuit as set forth in claim 7 wherein the second sample period is 65,536 ($256^2$) clock cycles and the second counter is an 8-bit counter.

13. The bus utilization detection circuit as set forth in claim 9 wherein the first and second clock dividers each divide an incoming clock signal by 256.

14. The bus utilization detection circuit as set forth in claim 7 wherein the second comparator is to be coupled to a reset input of an idle timer such that the idle timer is reset in response to the activity event signal being asserted.

15. A method for detecting activity on a bus in a computer system including a clock, the method comprising the steps of:

determining a number of bus events on the bus during a first sample period;

determining a number of first sample periods within a second sample period in which the number of bus events meets a first threshold value;

asserting an activity event signal if the determined number of first sample periods meets or exceeds a second threshold value; and indicating bus inactivity if an activity event signal is not asserted within an idle time period wherein the first and second sample periods are each a subset of the idle time period.

16. The method as set forth in claim 15 wherein the step of determining a number of bus events includes a step of incrementing a first counter.

17. The method as set forth in claim 15 wherein the step of determining a number of first sample periods includes a step of comparing the number of bus events to the first threshold value.

18. The method as set forth in claim 15 further including a step of enabling bus utilization detection logic.

19. The method as set forth in claim 15 further including a step of programming the first and second threshold values.

20. A computer system comprising;

a bus;

a processor coupled to the bus to process instructions for the computer system;

power management control logic coupled to the bus to activate power management measures in response to being enabled;

a bus utilization detection circuit including
        a bus event input coupled to the bus to detect bus events, and
        logic coupled to the bus event input and the idle timer to determine a number of first sample periods, within a second sample period, in which a number of detected bus events meets a first threshold value, the logic to generate an activity event if the determined number of first sample periods meets or exceeds a second threshold value, and;

an idle timer coupled to the bus utilization detection circuit and the power management control logic, the idle timer to enable the power management control logic unless an activity event is generated before expiration of the idle timer wherein the first and second sample periods are each a subset of the idle time period indicated by the idle timer.

21. The computer system as set forth in claim 20 wherein the bus is a peripheral components interconnect (PCI) bus.

22. The computer system as set forth in claim 21 wherein the bus events are indicated by a FRAME# signal.

23. The apparatus of claim 1 further comprising:

an idle timer coupled to the second circuit, the idle timer to measure the idle time period, the idle timer to trigger a power management event upon expiration of the idle time period unless the second circuit generates an activity event during the idle time period.

24. The apparatus of claim 2 further comprising:

an idle timer coupled to the circuit, the idle timer to indicate the third idle time period, the idle timer to trigger a power management event upon expiration of the idle time period unless the circuit generates an activity event during the idle time period.

25. The bus utilization detection circuit as set forth in claim 7 further comprising:

an idle timer coupled to the second comparator, the idle timer to indicate the idle time period, the idle timer to cause a power management event upon expiration of the idle time period unless the second comparator asserts an activity event signal during the idle time period.

26. The method as set forth in claim 15 further including a step of:

taking a power management measure in response to the step of indicating bus inactivity.

\* \* \* \* \*